(12) United States Patent
Whang et al.

(10) Patent No.: US 11,590,478 B2
(45) Date of Patent: Feb. 28, 2023

(54) ELECTROCATALYST AND METHOD OF PREPARING THE SAME

(71) Applicant: Research & Business Foundation Sungkyunkwan University, Suwon-si (KR)

(72) Inventors: Dongmok Whang, Suwon-si (KR); Mansu Kim, Suwon-si (KR)

(73) Assignee: Research & Business Foundation Sungkyunkwan University, Suwon-si (KR)

(*) Notice: Subject to any disclaimer, the term of this patent is extended or adjusted under 35 U.S.C. 154(b) by 94 days.

(21) Appl. No.: 17/004,271

(22) Filed: Aug. 27, 2020

(65) Prior Publication Data
US 2021/0060533 A1 Mar. 4, 2021

(51) Int. Cl.
| | | |
|---|---|---|
| *B01J 21/06* | (2006.01) | |
| *B01J 37/08* | (2006.01) | |
| *H01M 4/90* | (2006.01) | |
| *B01J 23/745* | (2006.01) | |
| *B01J 35/00* | (2006.01) | |
| *B01J 35/10* | (2006.01) | |
| *B01J 21/18* | (2006.01) | |

(52) U.S. Cl.
CPC .......... *B01J 21/066* (2013.01); *B01J 23/745* (2013.01); *B01J 35/0033* (2013.01); *B01J 35/1019* (2013.01); *B01J 35/1023* (2013.01); *B01J 37/086* (2013.01); *H01M 4/9016* (2013.01); *H01M 4/9041* (2013.01); *H01M 4/9083* (2013.01); *B01J 21/18* (2013.01)

(58) Field of Classification Search
CPC ........ B01J 21/066; B01J 21/18; B01J 23/745; B01J 35/0033; B01J 35/1019; B01J 35/1023; B01J 37/086; B01J 31/1691; H01M 4/9016; H01M 4/9041; H01M 4/9083
USPC ................................. 502/101, 182, 185, 338
See application file for complete search history.

(56) References Cited

U.S. PATENT DOCUMENTS

| | | | | |
|---|---|---|---|---|
| 5,126,216 A | * | 6/1992 | Capuano | ................. H01M 4/92 |
| | | | | 502/101 |
| 9,825,308 B1 | * | 11/2017 | Liu | ...................... H01M 4/8657 |
| 10,335,765 B2 | * | 7/2019 | Shim | .................. G01N 33/0036 |
| 10,464,019 B2 | * | 11/2019 | Kim | ..................... B01D 53/944 |
| 10,882,807 B2 | * | 1/2021 | Dinca | ..................... C07C 31/12 |

(Continued)

FOREIGN PATENT DOCUMENTS

| | | | | |
|---|---|---|---|---|
| KR | 10-1306664 B1 | | 9/2013 | |
| KR | 10 2249922 | * | 5/2021 | .............. B01J 35/00 |

OTHER PUBLICATIONS

Cao, Wenxiu, et al. "UiO-66 derived Ru/ZrO 2@ C as a highly stable catalyst for hydrogenation of levulinic acid to γ-valerolactone." *Green Chemistry*, 2201-2211. (Mar. 24, 2017)(11 pages in English).

(Continued)

*Primary Examiner* — Patricia L. Hailey
(74) *Attorney, Agent, or Firm* — NSIP Law

(57) ABSTRACT

An electrocatalyst includes a carbon substrate, metal oxide particles dispersed on the carbon substrate, and metal catalyst particles. The metal catalyst particles are metal substitutions in the metal oxide particles, or adsorbed on the metal oxide particles.

13 Claims, 13 Drawing Sheets

(56) References Cited

U.S. PATENT DOCUMENTS

| | | | | |
|---|---|---|---|---|
| 2012/0149560 A1* | 6/2012 | Lee | ............ | B01J 23/8892 |
| | | | | 502/343 |
| 2013/0196237 A1* | 8/2013 | Jin | ............ | H01M 4/9016 |
| | | | | 429/479 |
| 2015/0180045 A1* | 6/2015 | Liu | ............ | H01M 4/9016 |
| | | | | 429/527 |
| 2015/0295248 A1* | 10/2015 | Serov | ............ | H01M 4/9091 |
| | | | | 502/159 |
| 2018/0219240 A1* | 8/2018 | Gyenge | ............ | H01M 8/188 |
| 2019/0060888 A1* | 2/2019 | Liu | ............ | C08L 39/06 |
| 2020/0308721 A1* | 10/2020 | Shao-Horn | ............ | C07F 15/045 |

OTHER PUBLICATIONS

Bai, Yuxia, et al. "Electrochemical oxidation of ethanol on Pt—$ZrO_2$/C catalyst." *Electrochemistry Communications* 7.11 (2005): 1087-1090.(4 pages in English).

Korean Office Action dated Nov. 16, 2020 in a counterpart KR application No. 10-2019-0105209,(5 pages in Korean).

* cited by examiner

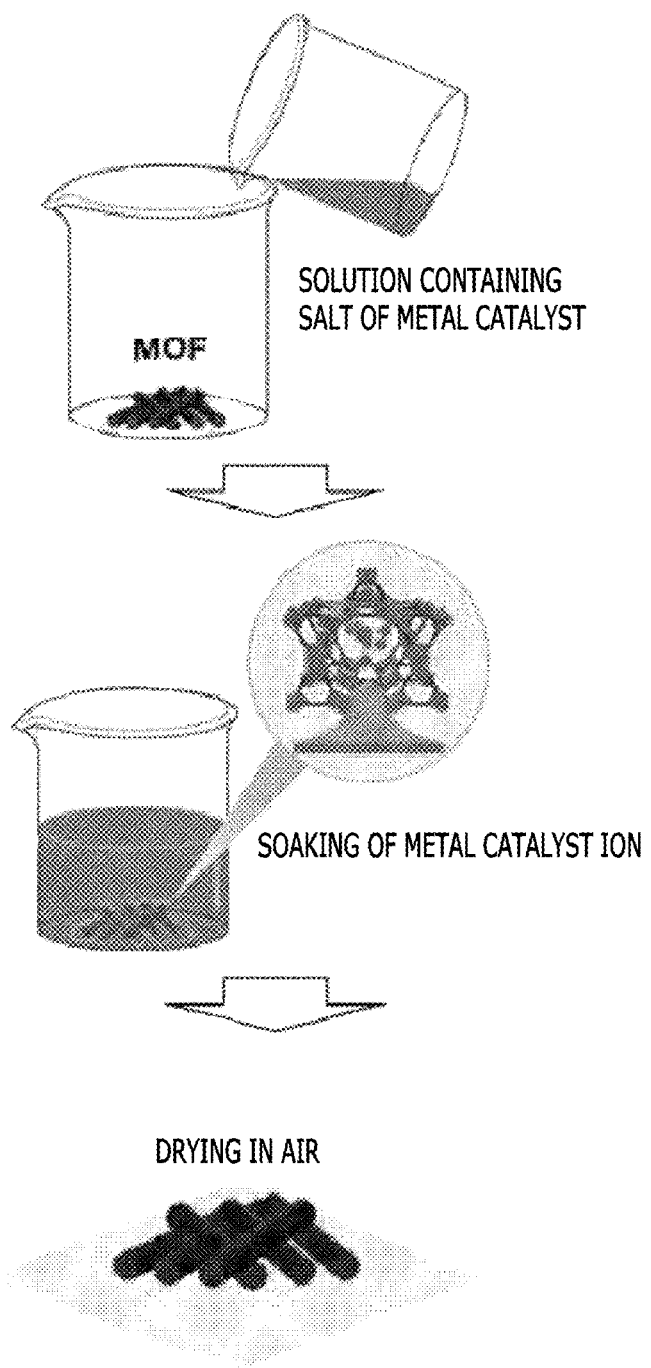
[Fig. 1]

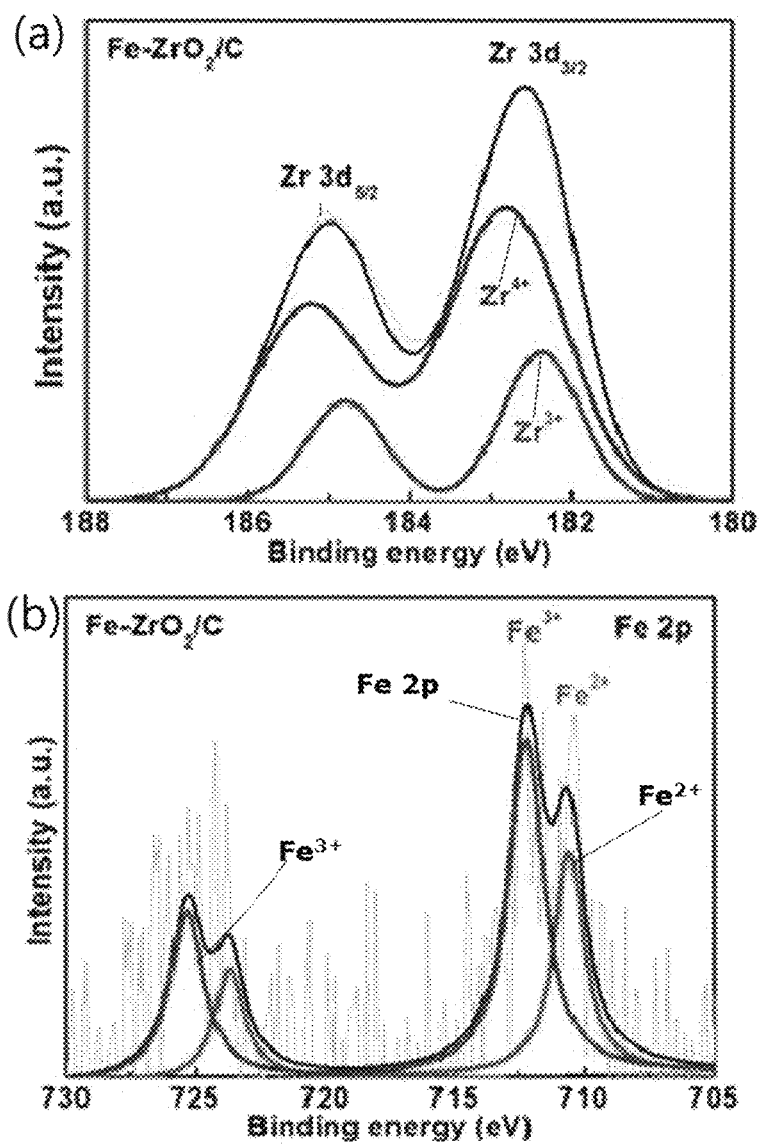
[Fig. 2]

[Fig. 3A]
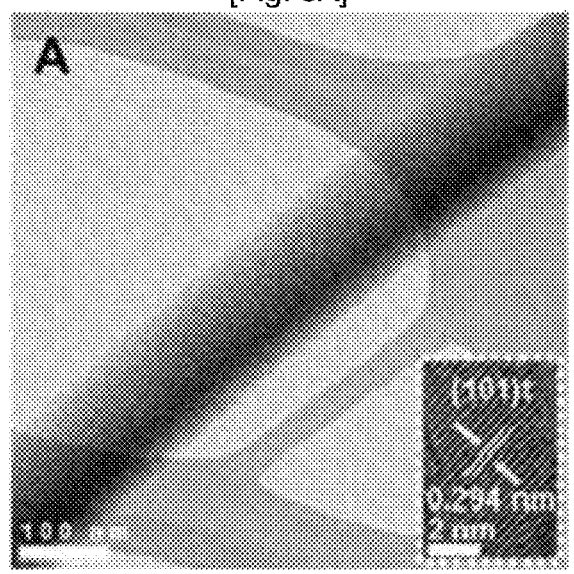

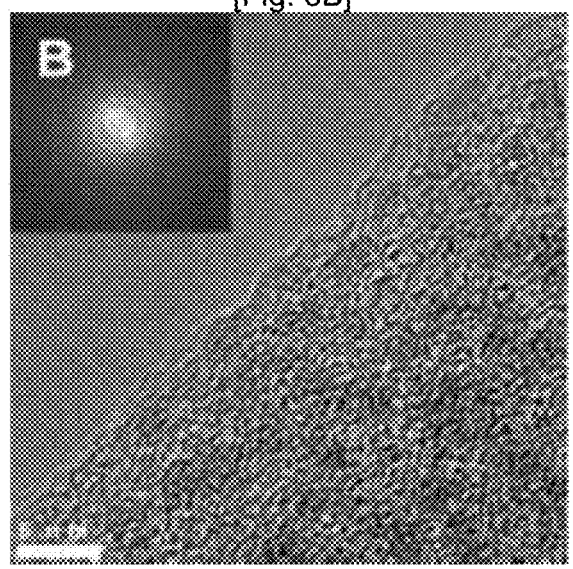
[Fig. 3B]

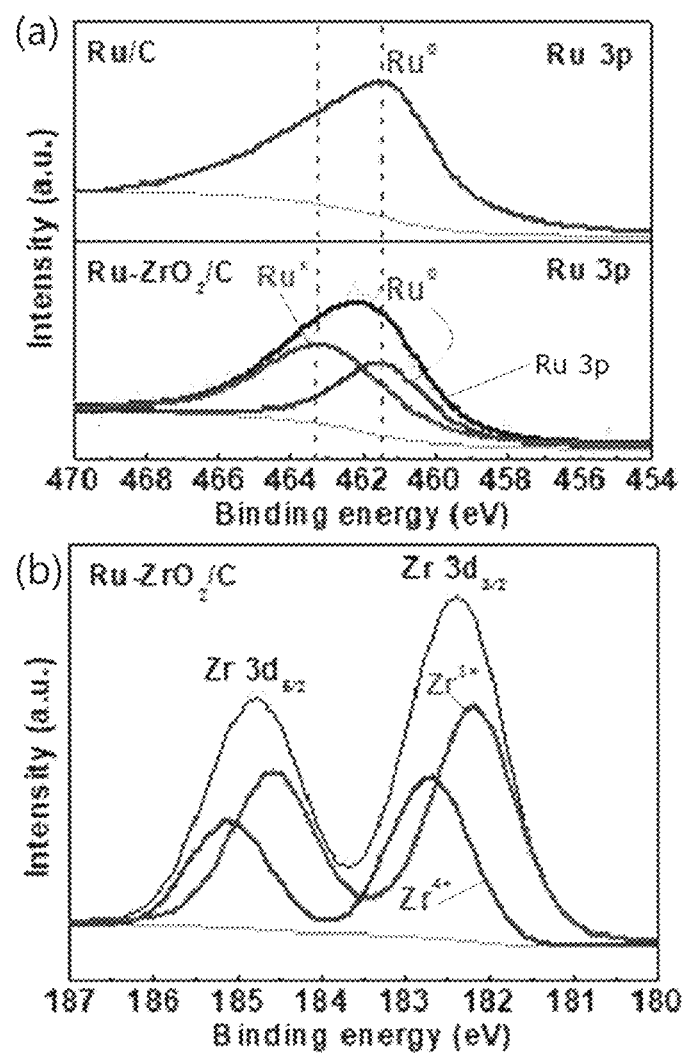
[Fig. 4]

[Fig. 5]
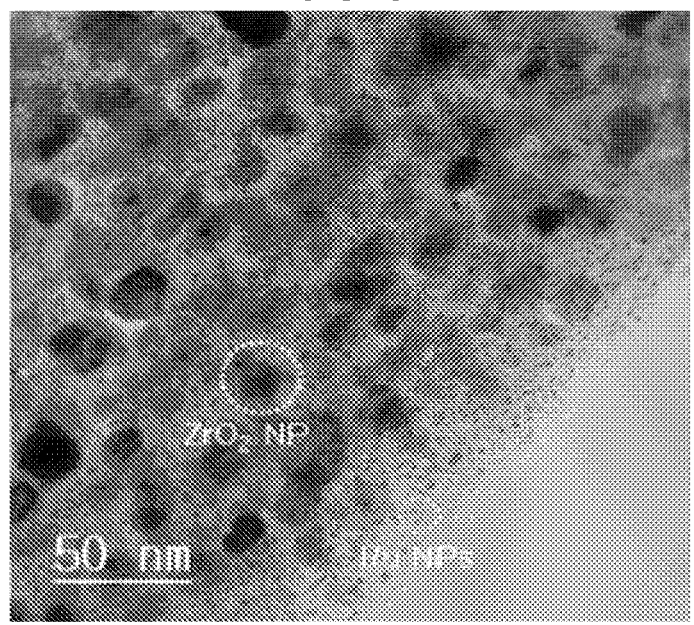
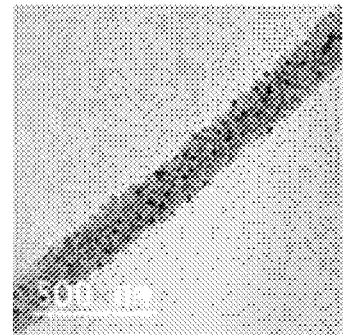
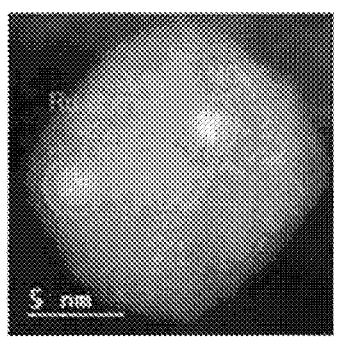
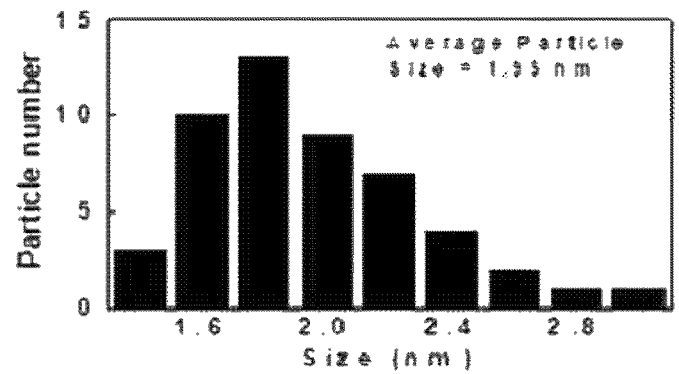

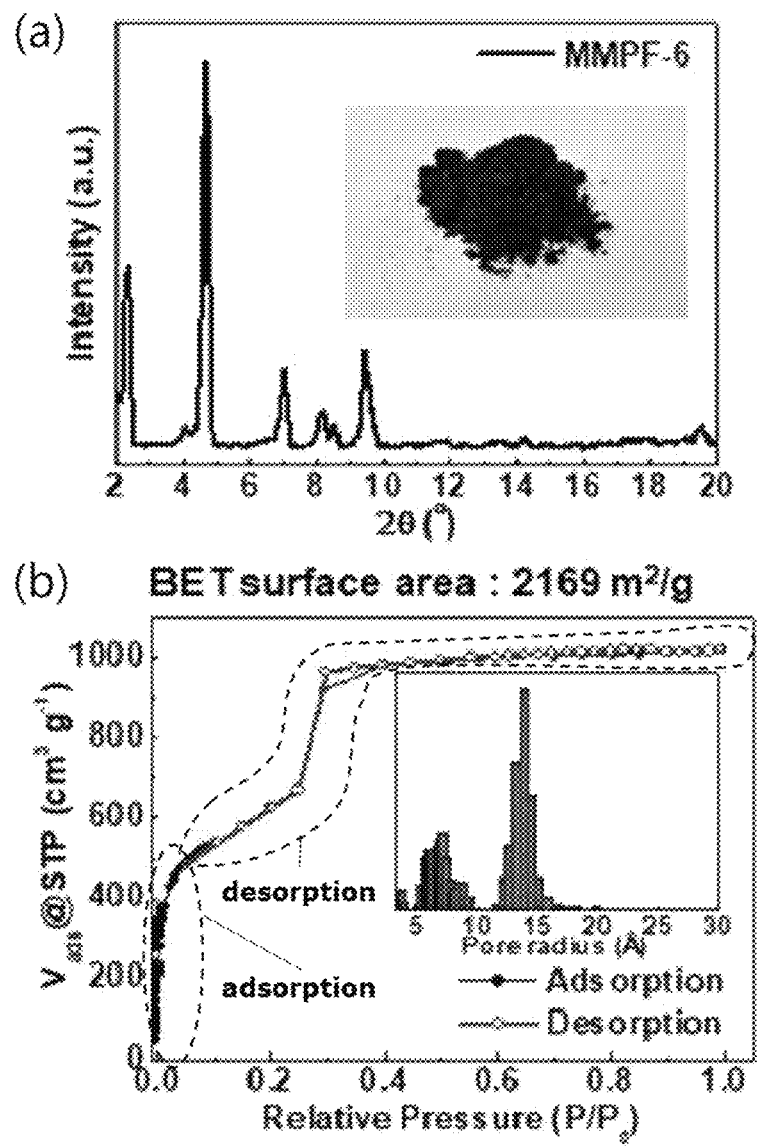
[Fig. 6]

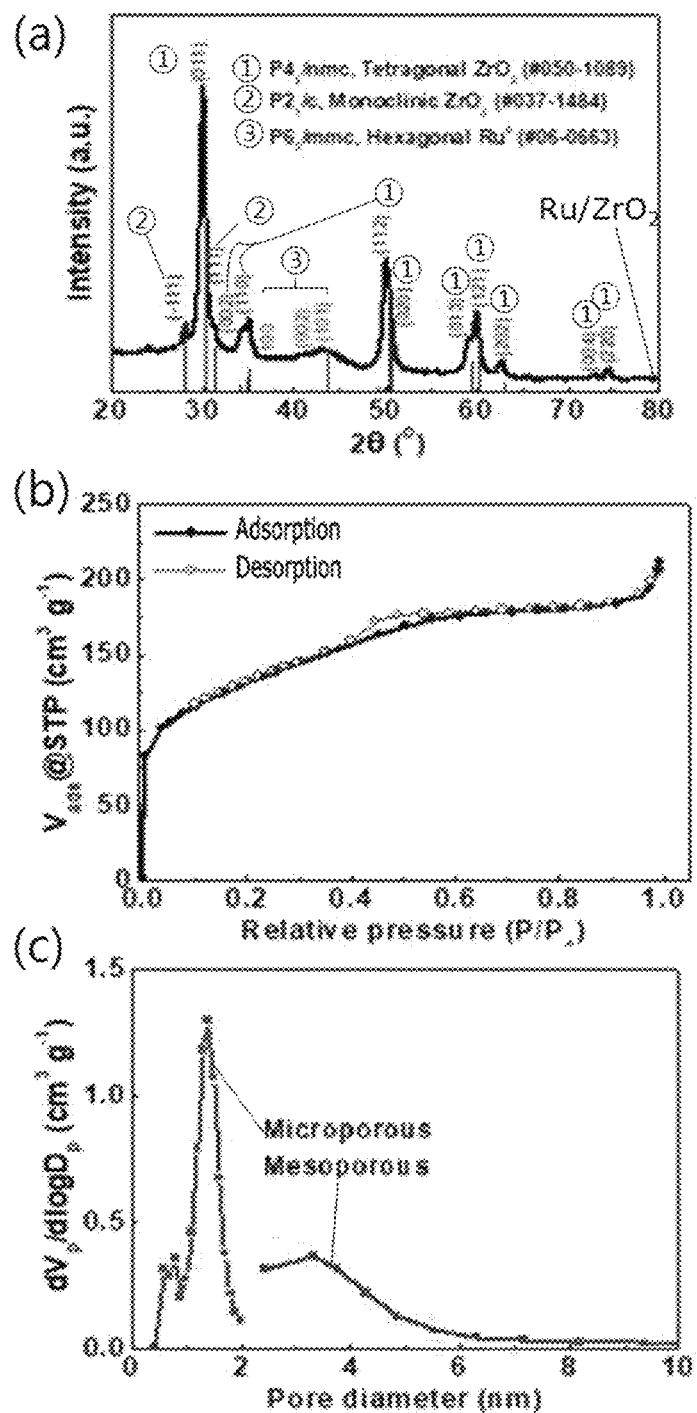
[Fig. 7]

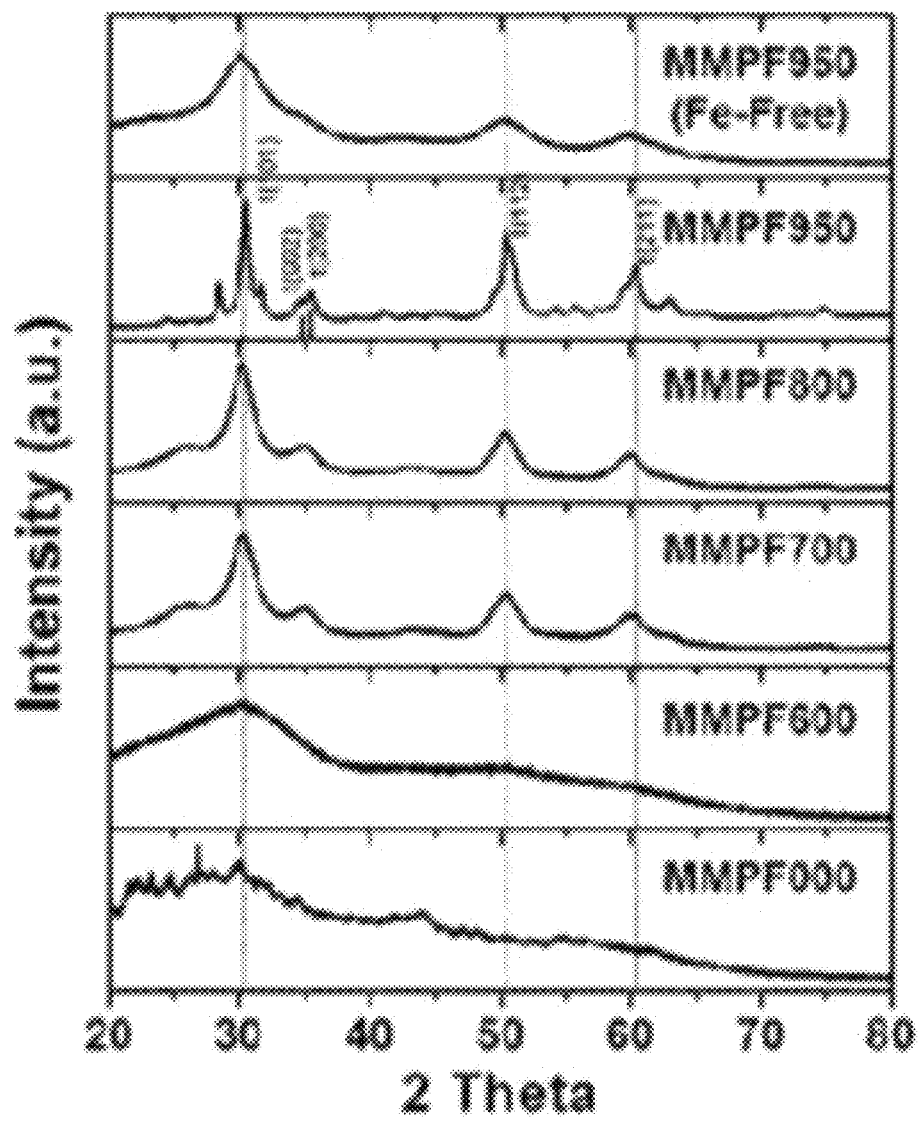
[Fig. 8A]

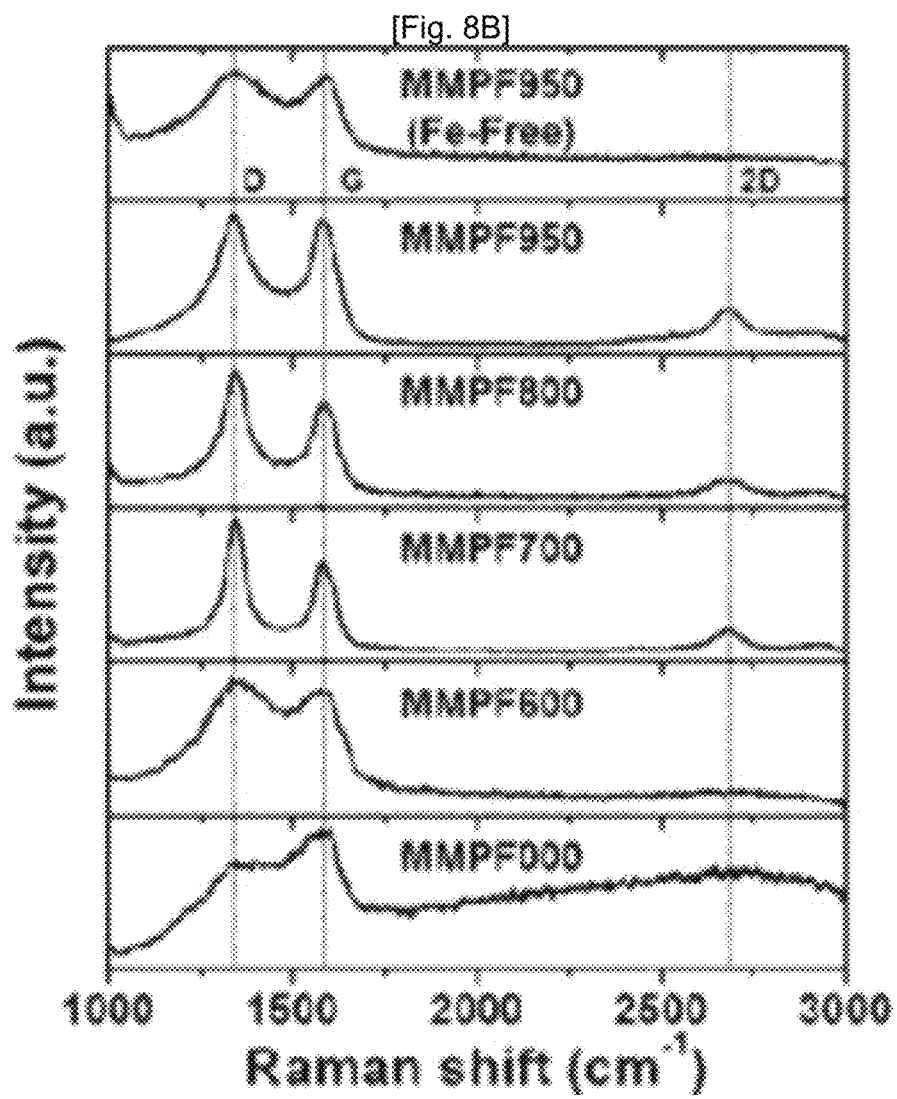

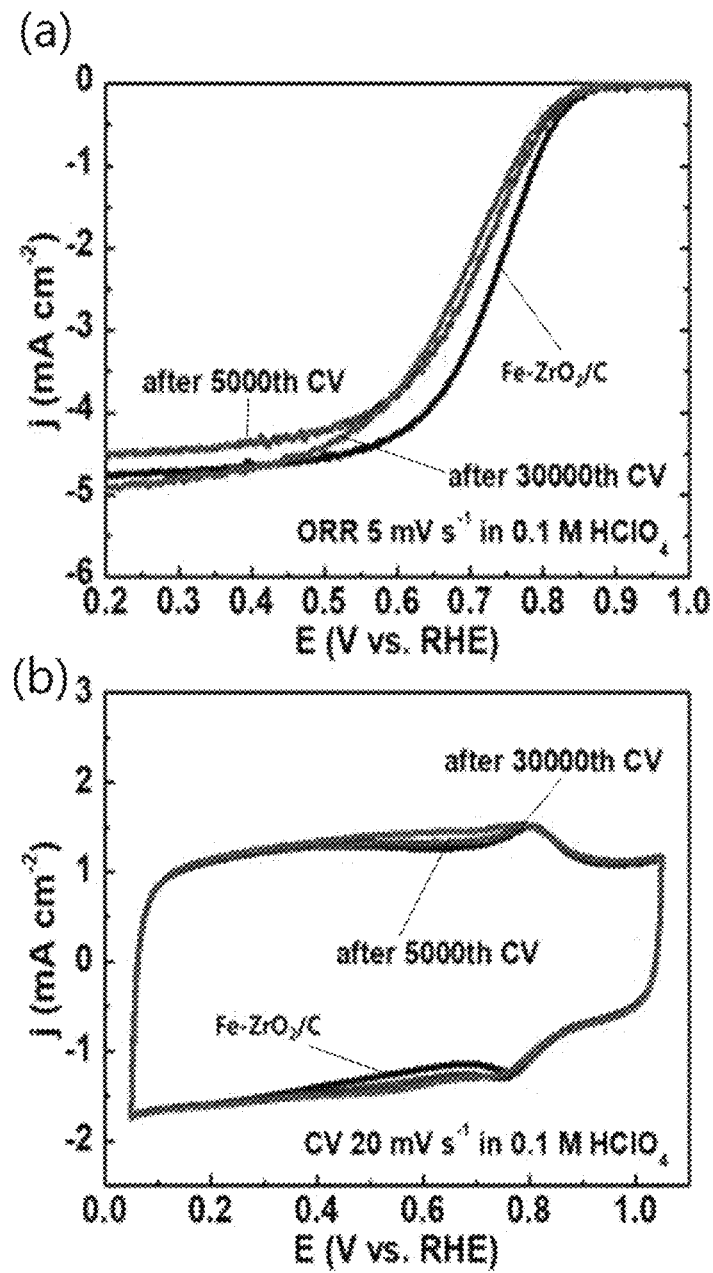
[Fig. 9]

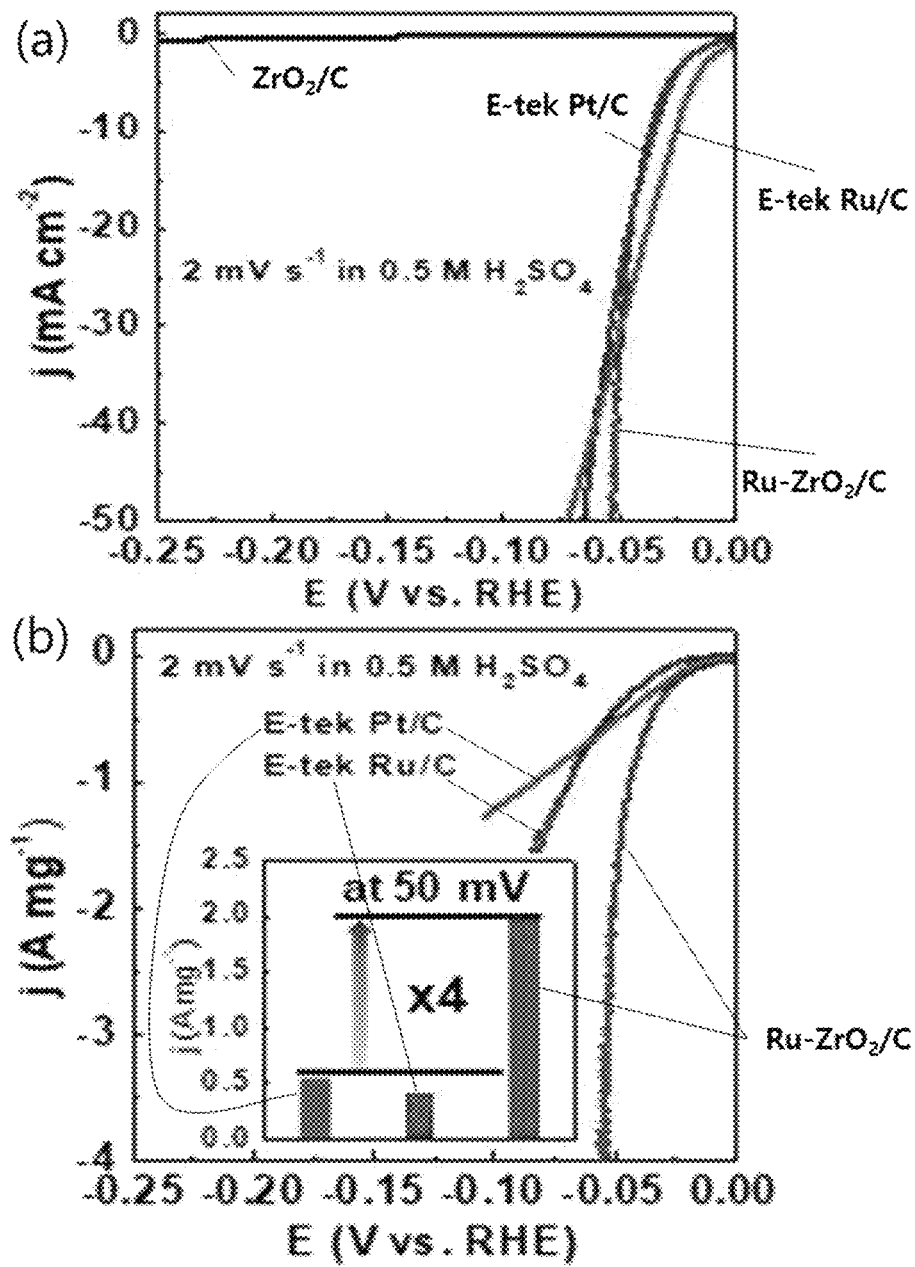
[Fig. 10]

[Fig. 11]
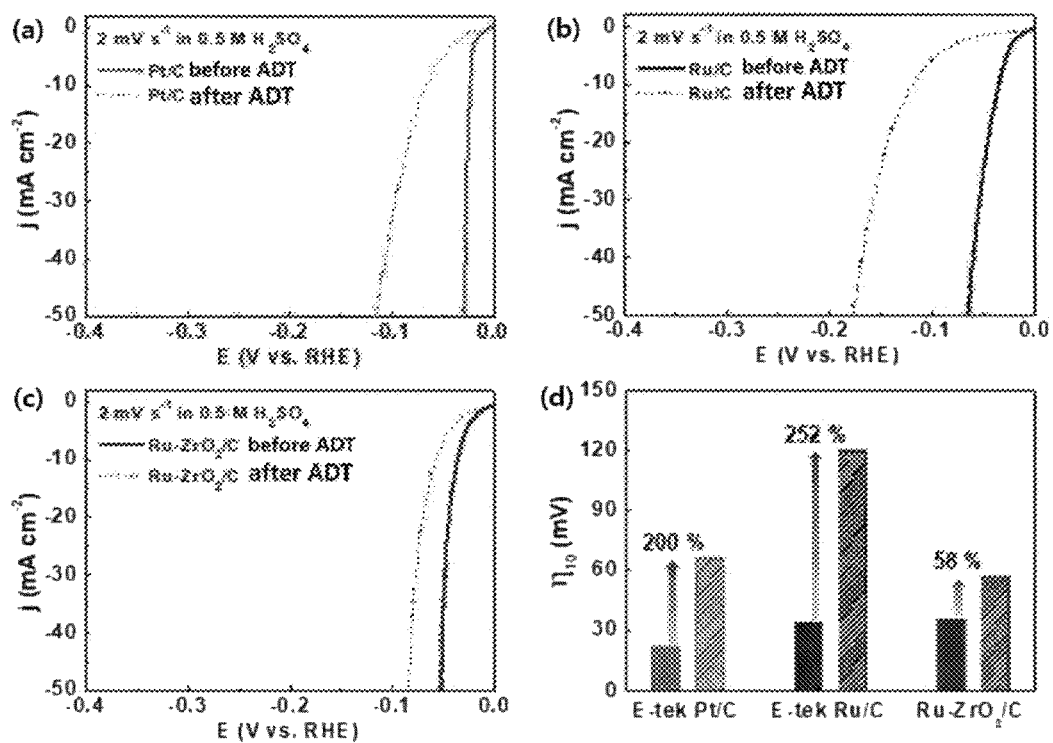

ELECTROCATALYST AND METHOD OF PREPARING THE SAME

CROSS-REFERENCE TO RELATED APPLICATION

This application claims the benefit under 35 USC 119(a) of Korean Patent Application No. 10-2019-0105209 filed on Aug. 27, 2019, the entire disclosure of which is incorporated herein by reference for all purposes.

BACKGROUND

1. Field

The present disclosure relates to an electrocatalyst and a method of preparing the same.

2. Description of Related Art

If fossil fuels, such as oil and coal, are burned for electric energy, transportation, and the like, carbon dioxide and methane are generated, which has been known to greatly affect environmental contaminations or global warming. To solve this problem, studies on various alternative energy sources such as hydrogen energy, solar energy, and the like are being conducted.

Examples of alternative energy sources include a fuel cell that produces water and electric energy by a reaction between hydrogen and oxygen. The fuel cell is a device that produces electric energy by an electrochemical reaction between fuel and an oxidizer and generally uses hydrogen ($H_2$) as fuel and oxygen ($O_2$) as an oxidizer. Therefore, the fuel cell can easily secure energy sources and has a high power generating efficiency in the range of from 40% to 80%. Also, the fuel cell makes relatively little noise when generating electric power, requires a small area for generating electric power, and emits water as exhaust. Accordingly, the fuel cell has been attracted attention as a next-generation energy device.

However, the reaction between hydrogen and oxygen for producing water and electric energy requires a lot of energy. Therefore, to commercialize the fuel cell, a catalyst for efficiently producing hydrogen and a catalyst for reducing the energy required for a reaction between hydrogen and oxygen are needed.

A catalyst which can be used for fuel cells may include a platinum catalyst and non-metal catalysts. The non-metal catalysts are more cost-competitive but less capable of reducing the energy required for a reaction to reduce oxygen and thus produce water and electric energy than the platinum catalyst. Also, the platinum catalyst can increase the efficiency of an oxygen reduction reaction or a hydrogen evolution reaction but use costly platinum, which makes it difficult to commercialize the platinum catalyst. To overcome these problems, studies on catalysts that can achieve efficiency equivalent to that of a platinum catalyst at low cost are being conducted.

As supports for such catalysts, metal-organic frameworks (MOFs) having a porous structure have received a lot of attention. The metal-organic frameworks are organic-inorganic hybrid materials consisting of metal ions or ion clusters coordinated to organic molecules to form one-, two- or three-dimensional structures. The MOFs have various chemical properties and thus can be used as catalysts for a reaction to produce hydrogen or produce water and electric energy.

Korean Patent No. 10-1306664, which is the background technology of the present disclosure, relates to a catalyst composition for fuel cells to substitute a platinum catalyst. This patent discloses a porous metal-organic framework synthesized with cobalt and benzimidazole to substitute a platinum catalyst but does not disclose a method for doping, substituting or adsorbing a metal catalyst by pyrolysis $ZrO_x$ cluster on MOF structures.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electrocatalyst includes a carbon substrate, metal oxide particles dispersed on the carbon substrate, and metal catalyst particles. The metal catalyst particles are metal substitutions in the metal oxide particles, or adsorbed on the metal oxide particles.

The metal oxide particles may include a member selected from the group consisting of $ZrO_2$, $CeO_2$, $HfO_2$, and combinations thereof.

The metal catalyst particles may be transition metals or precious metals.

The transition metals may include a member selected from the group consisting of Fe, Mn, Co, Ni, Cu, Cr, and combinations thereof.

The precious metals may include a member selected from the group consisting of Ir, Ru, Os, Rh, Pt, Pd, Au, Ag, and combinations thereof.

The metal components of the metal oxide particles may be substituted with the transition metals, or the transition metals and the precious metals may be adsorbed on the metal oxide particles.

The carbon substrate may include a member selected from the group consisting of graphite, porous carbon sheet, carbon fiber, graphene, graphene oxide, reduced graphene oxide, and combinations thereof.

In another general aspect, a method of preparing an electrocatalyst, includes: pyrolysis of a metal-organic framework (MOF) precursor, containing metal oxide clusters and organic materials, and a metal catalyst. Based on the pyrolysis of the MOF structure due to thermal treatment, the organic materials form a carbon substrate, the metal oxide clusters form metal oxide particles dispersed on the carbon substrate, and metal of the metal oxide particles is substituted with the metal catalyst or the metal catalyst is adsorbed on the metal oxide particles.

A specific surface area of the MOF precursor may be in a range of 1800 $m^2/g$ to 2200 $m^2/g$.

After the pyrolysis of the MOF structure, the carbon substrate may have a specific surface area of from 300 $m^2/g$ to 800 $m^2/g$.

The pyrolysis of the MOF precursor and the metal catalyst may include soaking the MOF precursor in a solution containing a salt of the metal catalyst, or metalation of the MOF precursor using a salt of the metal catalyst.

The MOF precursor may have a linear structure including any one or any two combination or more of a nanowire, a nanorod, a nanotube, a nanocable, a nanobelt, or a whisker.

The metal oxide clusters may include a member selected from the group consisting of $ZrO_x$, $CeO_x$, $HfO_x$, and combinations thereof.

The thermal treatment may be performed at a range of 700° C. to 1200° C.

Other features and aspects will be apparent from the following detailed description, the drawings, and the claims.

BRIEF DESCRIPTION OF THE DRAWINGS

FIG. 1 is a schematic diagram illustrating a method of preparing an electrocatalyst, according to an embodiment of the present disclosure.

(a) and (b) of FIG. 2 are graphs showing XPS analysis results for an electrocatalyst, according to an example of the present disclosure.

FIG. 3A and FIG. 3B are TEM images of the electrocatalyst, according to an example of the present disclosure.

(a) and (b) of FIG. 4 are graphs showing XPS analysis results for an electrocatalyst, according to an example of the present disclosure.

FIG. 5 provides TEM images of the electrocatalyst, according to an example of the present disclosure.

(a) and (b) of FIG. 6 provides graphs showing XRD and BET analysis results for an MOF structure, according to a comparative example of the present disclosure.

(a) to (c) of FIG. 7 are graphs showing XRD and BET analysis results for an electrocatalyst, according to an example of the present disclosure.

FIG. 8A and FIG. 8B are graphs showing XRD and Raman spectroscopy results for electrocatalysts, according to an example and a comparative example of the present disclosure.

(a) and (b) of FIG. 9 are graphs showing the current density of a fuel cell, including an electrocatalyst according to an example of the present disclosure.

(a) and (b) of FIG. 10 are graphs comparing hydrogen evolution reactions of water splitting including an electrocatalyst according to an example of the present disclosure or an MOF structure, according to a comparative example of the present disclosure.

(a) and (b) of FIG. 11 are graphs showing the long-term durability of an electrocatalyst according to a comparative example of the present disclosure, (c) of FIG. 11 is a graph showing the long-term durability of an electrocatalyst according to an example of the present disclosure, and (d) of FIG. 11 is a graph comparing the long-term durability of electrocatalysts according to an example and a comparative example of the present disclosure.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for."

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B."

Through the whole document, the term "organic material" refers to an organic material used in a general MOF structure and, specifically, refers to a material that includes one or more functional groups and may form two or more coordinate bonds with a metal oxide cluster or a metal oxide particle or may form a coordinate bond to each of two or more metal oxide clusters or metal oxide particles.

Hereinafter, an electrocatalyst and a method of preparing the same of the present disclosure will be described in detail with reference to embodiments, examples and drawings. However, the present disclosure is not limited to these embodiments, examples and drawings.

According to a first aspect of the present disclosure, there is provided an electrocatalyst, including a carbon substrate, metal oxide particles dispersed on the carbon substrate and metal catalyst particles, and the metal catalyst particles are present by being substituted for a metal of the metal oxide particles or by being adsorbed on the metal oxide particles.

The electrocatalyst according to the present disclosure may include a catalyst for a reaction for producing water and electric energy by oxidizing hydrogen depending on the kind of the metal catalyst particles, or a catalyst for a hydrogen evolution reaction (HER) and an oxygen evolution reaction (OER) through water splitting.

The HER and the OER, according to the present disclosure, refer to a water-splitting reaction.

Although will be described below, the electrocatalyst according to the present disclosure may be prepared by pyrolysis an MOF structure containing metal oxide clusters and organic materials and a metal catalyst.

If the MOF structure is used directly or after previously having been thermally treated, the MOF structure may include a storage source for energy resources such as hydrogen and a device for selectively adsorbing and separating a specific component from a gas mixture, and the electrocatalyst formed by bonding metal or the like onto pores of the MOF structure can be used as a catalyst for a water-splitting reaction or an oxidation-reduction reaction of a fuel cell.

However, in order to prepare the MOF structure containing the catalyst for a water-splitting reaction or an oxidation-reduction reaction of a fuel cell, it may be desirable to structurally stabilize the transition metal catalyst or immobilize mono-atoms of the precious metal catalyst not to be aggregated.

The present disclosure relates to an electrocatalyst containing the metal oxide particles dispersed on the carbon substrate formed by pyrolysis, the MOF structure, and the metal catalyst particles. Although will be described below, the electrocatalyst contains a transition metal substituted for the metal of the metal oxide particles or precious metal adsorbed on the metal oxide particles, and the transition metal is structurally stable, and atoms of the precious metal are adsorbed strongly on the metal oxide particles but not aggregated with each other. Therefore, it is possible to provide a fuel cell reaction catalyst or water-splitting catalyst with high efficiency.

The electrocatalyst may contain the metal catalyst particles substituted for the metal of the metal oxide particles as well as the metal catalyst particles adsorbed on the metal oxide particles.

According to an embodiment of the present disclosure, the metal oxide particles may include a member selected from the group consisting of $ZrO_2$, $CeO_2$, $HfO_2$, and combinations thereof, but may not be limited thereto.

Although it will be described below, the metal oxide particles may be formed by pyrolysis, an MOF containing metal oxide clusters, including a member selected from the group consisting of $ZrO_x$, $CeO_x$, $HfO_x$, and combinations thereof, but may not be limited thereto.

According to an embodiment of the present disclosure, the metal oxide particles may nanoparticles having a size in the range of from 3 nm to 20 nm, but may not be limited thereto. For example, the metal oxide particles may be in the range of from about 3 nm to about 20 nm, from about 3 nm to about 19 nm, from about 3 nm to about 18 nm, from about 3 nm to about 17 nm, from about 3 nm to about 16 nm, from about 3 nm to about 15 nm, from about 3 nm to about 14 nm, from about 3 nm to about 13 nm, from about 3 nm to about 12 nm, from about 3 nm to about 11 nm, from about 3 nm to about 10 nm, from about 3 nm to about 9 nm, from about 3 nm to about 8 nm, from about 3 nm to about 7 nm, from about 3 nm to about 6 nm, from about 3 nm to about 5 nm, from about 3 nm to about 4 nm, from about 4 nm to about 20 nm, from about 5 nm to about 20 nm, from about 6 nm to about 20 nm, from about 7 nm to about 20 nm, from about 8 nm to about 20 nm, from about 9 nm to about 20 nm, from about 10 nm to about 20 nm, from about 11 nm to about 20 nm, from about 12 nm to about 20 nm, from about 13 nm to about 20 nm, from about 14 nm to about 20 nm, from about 15 nm to about 20 nm, from about 16 nm to about 20 nm, from about 17 nm to about 20 nm, from about 18 nm to about 20 nm, from about 19 nm to about 20 nm, from about 4 nm to about 19 nm, from about 5 nm to about 18 nm, from about 6 nm to about 17 nm, from about 7 nm to about 16 nm, from about 8 nm to about 15 nm, from about 9 nm to about 14 nm, from about 10 nm to about 13 nm, or from about 11 nm to about 12 nm, but may not be limited thereto.

According to an embodiment of the present disclosure, the metal catalyst particles may be transition metals or precious metals, but may not be limited thereto.

The electrocatalyst according to the present disclosure may serve as a catalyst for various processes, for example, a hydrogen oxidation reaction, a CO oxidation reaction, a $CO_2$ reduction reaction, an $NH_3$ production process, an $H_2O_2$ production process as well as a water-splitting reaction and a water producing reaction, depending on the kind of metal catalyst particles.

According to an embodiment of the present disclosure, the transition metals may include a member selected from the group consisting of Fe, Mn, Co, Ni, Cu, Cr, and combinations thereof, but may not be limited thereto.

According to an embodiment of the present disclosure, the transition metals may oxidize $H_2$ to produce $H_2O$ and electric energy, but may not be limited thereto.

According to an embodiment of the present disclosure, metal components of the metal oxide particles may be substituted by the transition metals, but may not be limited thereto.

According to an embodiment of the present disclosure, the transition metals may be adsorbed on the metal oxide particles, but may not be limited thereto.

The transition metals containing $Fe^{3+}$ ions may be substituted with the metal oxide particles, for example, $Zr^{4+}$ ions from $ZrO_2$, and doped on the metal oxide particles. If an oxide (for example, $Fe_3O_3$, $MnO_2$, $Co_2O_3$, $Ni_2O_3$, and CuO) of the transition metals is present alone in a strong acid, the structure of the oxide of the transition metals may collapse, and, thus, a reduction reaction of hydrogen may not be carried out smoothly.

However, if the transition metals are doped or substituted on the metal oxide particles as in the transition metal catalyst according to the present disclosure, the water producing reaction can be carried out stably in a strong acid, and, thus, $H_2O$ and electric energy can be produced smoothly.

Specifically, the electrocatalyst containing the transition metals may induce a water producing reaction for producing water by a reaction among oxygen molecules adsorbed on the transition metals, $H^+$ ions from the strong acid and electrons.

According to an embodiment of the present disclosure, the precious metals may include a member selected from the group consisting of Ir, Ru, Os, Rh, Pt, Pd, Au, Ag, and combinations thereof, but may not be limited thereto.

According to an embodiment of the present disclosure, the precious metals may reduce $H^+$ ions to produce $H_2$, but may not be limited thereto.

Even when the precious metals are dispersed on another substrate, which does not contain the metal oxide particles, the carbon substrate, $H^+$ ions can be reduced. However, the precious metals are not strongly bonded to the another substrate; atoms of the precious metals are bonded to each other, and the surface area of the precious metals decreases, which may cause a decrease in efficiency of $H^+$ ion reduction reaction.

The precious metals on the electrocatalyst according to the present disclosure may be adsorbed in the form of particles of from 1 nm to 2 nm in size or mono-atoms on the surface of the metal oxide particles, for example, $ZrO_2$. In this case, the precious metals are strongly adsorbed on the surface of $ZrO_2$ by the strong metal-support interaction (SMSI) effect, and, thus, the bonding of the precious metal atoms does not occur. Therefore, the electrocatalyst in which the precious metals are adsorbed on the metal oxide particles can produce $H_2$ with high efficiency.

According to an embodiment of the present disclosure, $H_3O^+$ adsorbed on the surface of precious metals adsorbed on the metal oxide particles may move to the metal oxide particles or the carbon substrate, but may not be limited thereto.

Specifically, if the electrocatalyst containing precious metals is soaked in strong acid for water splitting, $H^+$ ions from the strong acid are bonded to $H_2O$ molecules in the solution to produce $H_3O^+$. The $H_3O^+$ are readily adsorbed onto the metal oxide particles such as $ZrO_2$. In this process, the $H_3O^+$ ions are reduced to hydrogen by a reaction with the precious metals adsorbed on the metal oxide particles. As such, $H_3O^+$ ions are transported to the precious metal particles using the metal oxide particles, and thus, a process for producing hydrogen using the precious metal particles is referred to as "hydrogen reverse spillover."

Specifically, in order to increase a hydrogen evolution rate by letting a high current flow during the hydrogen-producing process, a lot of $H^+$ ions are required for a reaction. If the $H^+$ ions are not transported to the precious metal metals, the hydrogen evolution rate decreases. The catalyst for a water-splitting reaction needs to have a structure in consideration of the hydrogen reverse spillover to transport the $H^+$ ions or $H_3O^+$ ions to the precious metal particles using the metal oxide particles.

In this regard, the carbon substrate has a porous structure, and, thus, the $H_2$ is discharged to the outside of the carbon substrate and stored in a container that can store $H_2$, or if the $H_2$ is not discharged to the outside of the carbon substrate, the electrocatalyst containing the metal oxide particles with the precious metals adsorbed thereon and the carbon substrate may further function to store $H_2$.

If a conventional precious metal catalyst is used to produce hydrogen, a high overvoltage may be generated due to gas bubbles generated during the reaction and repeated turn on-off, which may cause a degradation instability of the catalyst. The conventional precious metal catalyst whose stability has been degraded may be dissolved to metal ions or bonded to other precious metal atoms, which may cause a further decrease in the efficiency of the catalyst.

However, as for the electrocatalyst containing precious metals according to the present disclosure, the metal oxide particles immobilize the precious metals, and, thus, the precious metals can be stably present even in a harsh environment such as high overvoltage caused by gas bubbles and repeated turn on-off. Therefore, the electrocatalyst is highly practical in that it can be used to produce hydrogen as an alternative to conventional catalysts for producing hydrogen.

According to an embodiment of the present disclosure, the carbon substrate may include a member selected from the group consisting of graphite, porous carbon sheet, carbon fiber, graphene, graphene oxide, reduced graphene oxide and combinations thereof, but may not be limited thereto. For example, the carbon substrate may be graphite, but may not be limited thereto.

Although it will be described below, the carbon substrate, according to the present disclosure, is prepared by pyrolysis, an MOF precursor. In this regard, the carbon substrate has a porous structure due to the thermal treatment, and the metal oxide particles, including the metal catalyst particles may be present on pores of the porous structure.

Therefore, the metal oxide particles may increase in surface area due to the carbon substrate having the porous structure, which means the efficiency of a water-splitting reaction, for example, $H_2$ or $O_2$ evolution reaction by the electrocatalyst according to the present disclosure increases.

Also, according to a second aspect of the present disclosure, there is provided a method of preparing an electrocatalyst, including pyrolysis a metal-organic framework (MOF) precursor containing metal oxide clusters and organic materials and a metal catalyst, and since the MOF structure is thermally treated, the organic materials form a carbon substrate and the metal oxide clusters form metal oxide particles dispersed on the carbon substrate, and since the MOF structure is thermally treated, the metal of the metal oxide particles is substituted with the metal catalyst, or the metal catalyst is adsorbed on the metal oxide particles.

The electrocatalyst prepared by the method of preparing an electrocatalyst may contain the metal catalyst particles substituted for the metal of the metal oxide particles as well as the metal catalyst particles adsorbed on the metal oxide particles.

Detailed descriptions of the method of preparing an electrocatalyst according to the second aspect of the present disclosure, which overlap with those of the first aspect of the present disclosure, are omitted hereinafter, but the descriptions of the first aspect of the present disclosure may be identically applied to the second aspect of the present disclosure, even though they are omitted hereinafter.

The MOF structure according to the present disclosure is a metal-organic framework and refers to an organic-inorganic hybrid material consisting of metal ions or ion clusters coordinated to an organic material to form a one-, two- or three-dimensional structure and having a regular structure with high porosity and a high specific surface area. For example, if the MOF structure has a simple cubic (SC) structure, an inorganic material (metal ions or metal clusters) is present on each vertex of the SC structure and the organic material may be present on the inorganic material and each edge connecting inorganic materials, but may not be limited thereto.

In general, an MOF structure of a catalyst, including the MOF structure, has been mainly used as a support for immobilizing catalyst particles. However, although will be described below, the method of preparing an electrocatalyst according to the present disclosure includes a process of soaking the MOF structure so that the metal catalyst particles can be present on the MOF structure and a process of converting the MOF structure into the carbon substrate containing the metal oxide particles through thermal treatment. That is, in the method of preparing an electrocatalyst according to the present disclosure, the MOF structure can be used as a precursor.

The organic material according to the present disclosure may include a member selected from the group consisting of —$CO_2H$, —$CS_2H$, —$CH(RSH)_2$, —$C(RSH)_3$—$CH(RNH_2)_2$—$C(RNH_2)_3$, —$CH(ROH)_2$, —$C(ROH)_3$, —$CH(RCN)_2$, —$C(RCN)_3$ and combinations thereof, but may not be limited thereto.

In the organic material, R may include an alkane group, an alkene group, or an alkyne group having 1 to 6 carbon atoms or an aryl group having at least one aromatic ring, but may not be limited thereto.

Desirably, the organic material may include porphyrin consisting of four pyrrole rings linked to each other, but may not be limited thereto.

A metal-oxide cluster, according to the present disclosure, refers to an aggregate of metal oxide particles with a size in the range of from 1 nm to 3 nm and may have physical or chemical properties different from those of metal oxide particles in a bulk state.

According to an embodiment of the present disclosure, a specific surface area of the MOF precursor may be in the range of from 1800 $m^2/g$ to 2200 $m^2/g$, but may not be limited thereto.

According to an embodiment of the present disclosure, after the MOF structure is thermally treated, the carbon substrate may have a specific surface area of from 300 $m^2/g$ to 800 $m^2/g$, but may not be limited thereto.

The metal oxide cluster present on the MOF structure may be changed to metal oxide particles through thermal treatment. During the thermal treatment, the metal oxide cluster may change to the metal oxide particles and may increase in specific surface area.

However, the porphyrin is carbonized and structurally changed during the thermal treatment, and, thus, pores in the MOF structure are changed in size due to the organic material. Therefore, the electrocatalyst may decrease in specific surface area compared to the MOF structure. If the thermal treatment is performed in an inert gas such as Ar or $N_2$, the complete carbonization of the organic material can be suppressed. Also, oxygen required to form the metal oxide particles is insufficient, and thus, small-sized metal oxide particles can be formed. If the MOF structure contains a transition metal such as Fe, Co, or the like, the MOF structure can be formed into a porous carbon substrate with high conductivity.

According to an embodiment of the present disclosure, the pyrolysis of the MOF precursor and the metal catalyst may include soaking the MOF precursor in a solution containing a salt of the metal catalyst, or metalation of the MOF precursor using a salt of the metal catalyst, but may not be limited thereto.

According to an embodiment of the present disclosure, the metal oxide cluster may include a member selected from the group consisting of $ZrO_x$, $CeO_x$, $HfO_x$, and combinations thereof, but may not be limited thereto.

$ZrO_x$ is a ceramic material having a very low reactivity and typically refers to a $ZrO_2$ material in which a number of oxygen particles are bonded to Zr particles. Since $ZrO_2$ has high brittleness, high strength, high chemical resistance, and wear resistance, it is difficult to chemically process $ZrO_2$. Also, $ZrO_2$ does not react with other materials.

As described above, the method of preparing an electrocatalyst according to the present disclosure uses the MOF structure as a precursor. In this regard, if an inorganic material of the MOF structure includes $ZrO_x$ when the MOF structure is thermally treated, $ZrO_x$ is converted into $ZrO_2$. Also, Zr is substituted by particles of the metal catalyst, and/or particles of the metal catalyst are adsorbed onto $ZrO_2$ particles. Thus, the reactivity of the electrocatalyst containing $ZrO_2$ can be improved.

FIG. 1 is a schematic diagram illustrating a method of preparing an electrocatalyst, according to an embodiment of the present disclosure.

Referring to FIG. 1, the MOF structure is soaked in a solution containing a salt of the metal catalyst, and, thus, particles of the metal catalyst may be present inside the MOF structure. Then, the MOF structure may contain thereon the salt of the metal catalyst by evaporating a solvent of the solution.

For example, if the solution contains $FeCl_3$, $FeCl_3$ may be present inside or outside the MOF structure. If the MOF structure containing $FeCl_3$ is thermally treated, Fe ions from $FeCl_3$ may be substituted for the metal of the metal oxide particles changed from the metal oxide clusters of the MOF structure or adsorbed on the metal oxide particles. Thus, an electrocatalyst that can produce $H_2O$ and electric energy may be prepared.

Otherwise, if the solution contains $RuCl_3$, $RuCl_3$ may be present inside or outside the MOF structure. If the MOF structure containing $RuCl_3$ is thermally treated and treated with an acid, Ru ions may be adsorbed in the form of Ru mono-atoms or Ru nanoparticles on the metal oxide particles of the MOF structure. Thus, an electrocatalyst that can produce hydrogen by a reaction with $H_3O^+$ may be prepared.

According to an embodiment of the present disclosure, the MOF precursor may have a linear structure, including a nanowire, a nanorod, a nanotube, a nanocable, a nanobelt, a whisker, and combinations thereof, but may not be limited thereto.

According to an embodiment of the present disclosure, the structure of the electrocatalyst may be identical to that of the MOF structure, but may not be limited thereto.

According to an embodiment of the present disclosure, the thermal treatment may be performed at from 700° C. to 1200° C., but may not be limited thereto.

Hereinafter, the present disclosure will be described in more detail with reference to examples. The following examples are provided only for an explanation but do not intend to limit the scope of the present disclosure.

Example 1

A rod-shaped MOF structure containing $ZrO_x$ and porphyrin was prepared. Then, the MOF structure was soaked in a methanol solution containing $FeCl_3$ for about 18 hours, for example. Thereafter, methanol present inside and outside of the MOF structure was removed, followed by a thermal treatment from 600° C. to 1000° C., and sonication in a 1 M HCl solution for 20 hours or more with stirring. As a result, a Fe—$ZrO_2$/C catalyst was prepared.

Example 2

A rod-shaped MOF structure containing $ZrO_x$ and porphyrin was prepared. Then, the MOF structure was soaked in a methanol solution containing $RuCl_3$ for about 18 hours, for example. Thereafter, methanol present inside and outside the MOF structure was removed, followed by a thermal treatment from 600° C. to 1000° C., and sonication in a 1 M HCl solution for 20 hours or more with stirring. As a result, a Ru—$ZrO_2$/C catalyst was prepared.

Comparative Example 1

After an MOF structure containing $ZrO_x$ and porphyrin was prepared, a metal catalyst was not added thereto (Zr-MOF).

Comparative Example 2

E-tek Pt/C or E-tek Ru/C, which is a catalyst for producing hydrogen produced by E-tek, was used as a comparative example.

Test Example 1

(a) and (b) of FIG. 2 are graphs showing XPS analysis results for an electrocatalyst according to Example 1 of the present disclosure, and FIG. 3A and FIG. 3B are TEM images of the electrocatalyst, according to Example 1 of the present disclosure.

(a) and (b) of FIG. 4 are graphs showing XPS analysis results for an electrocatalyst according to Example 2 of the present disclosure, and FIG. 5 illustrates TEM images of the electrocatalyst, according to Example 2 of the present disclosure. In this regard, Ru is adsorbed on the $ZrO_2$ particles.

Referring to FIG. 2, it can be seen that the Fe ions are substituted with $Zr^{4+}$ ions from $ZrO_2$ and present in the form of $Fe^{3+}$ ions. Also, referring to FIG. 3, it can be seen that even if the MOF structure is thermally treated, it maintains its rod shape, and $ZrO_2$ has a monoclinic structure at room temperature, but changes to a tetragonal structure in which the distance between lattices is 0.294 nm, and the (101)t plane have a size of from 2 nm to 5 nm through a thermal treatment.

Referring to FIG. 4, it can be seen that the oxidation number of Ru and Zr elements is changed by bonding between Ru and $ZrO_2$, which is affected by 0 from $ZrO_2$. Also, referring to FIG. 5, $Zr^{4+}$ ions are reduced to $Zr^{3+}$ ions by a thermal treatment and defects such as oxygen vacancies within $ZrO_2$. Further, the oxygen vacancies may promote a Ru reduction environment and help Ru to be adsorbed on the surface of $ZrO_2$. Also, it can be seen that the Ru nanoparticles having a size of 2 nm are present as being adsorbed on $ZrO_2$ nanoparticles, and the catalyst of Example 2 has a rod shape like the catalyst of Example 1.

Test Example 2

(a) and (b) of FIG. 6 are graphs showing XRD and BET analysis results for an MOF structure according to Comparative Example of the present disclosure.

Referring to FIG. 6, it can be seen that Zr-MOF is a violet powder having a crystal structure and has a specific surface area of about 2200 $m^2$/g. Further, it can be seen that the Zr-MOF has a porous structure based on various radiuses of pores in the Zr-MOF.

(a) to (c) of FIG. 7 are graphs showing XRD and BET analysis results for the electrocatalyst according to Example 2 of the present disclosure.

Referring to FIG. 7, it can be seen that the Ru—$ZrO_2$/C catalyst has a tetragonal structure with micropores having a size of 2 nm or less and mesopores having a size of from 2 nm to 10 nm and has a specific surface area of about 500 $m^2$/g.

FIG. 8A and FIG. 8B are graphs showing XRD and Raman spectroscopy results for the electrocatalysts according to Example 1 and Comparative Example of the present disclosure. Specifically, the last three digits for each sample represent the temperature when a thermal treatment was performed for 1 hour, and MMPF000 represents a sample without a thermal treatment, and MMPF950 (Fe-Free) represents a sample prepared according to the above comparative example.

Referring to FIG. 8, it can be seen that as the temperature for performing the thermal treatment increases, the catalyst of Example 1 has a tetragonal structure and increases in carbon conductivity. Also, it can be seen that as the temperature for a thermal treatment increases, peaks increase in height, and MMPF950 thermally treated at 950° C. for 1 hour has the highest conductivity and a definite tetragonal structure to prepare the electrocatalyst according to Example 1.

Test Example 3

(a) and (b) of FIG. 9 are graphs showing the current density of a fuel cell, including the electrocatalyst according to Example 1 of the present disclosure.

Referring to FIG. 9, it can be seen that the Fe—$ZrO_2$/C catalyst can cause an oxygen reduction reaction (ORR), and even when the ORR is performed 30,000 times, the performance thereof is maintained.

(a) and (b) of FIG. 10 are graphs comparing hydrogen evolution reactions of water splitting, including the electrocatalyst according to Example 2 of the present disclosure or the MOF structure according to Comparative Example of the present disclosure.

(a) and (b) of FIG. 11 are graphs showing the long-term durability of the electrocatalyst according to Comparative Example of the present disclosure, (c) of FIG. 11 is a graph showing the long-term durability of the electrocatalyst according to Example 2 of the present disclosure, and (d) of FIG. 11 is a graph comparing the long-term durability of the electrocatalysts according to Example 2 and Comparative Example of the present disclosure.

Specifically, the E-tek Pt/C, E-tek Ru/C, and Ru—$ZrO_2$/C catalysts were tested 30,000 times and then, the results of the activity of hydrogen evolution reaction were compared.

Referring to FIG. 10, it can be seen that E-tek Pt/C, E-tek Ru/C, and Ru—$ZrO_2$/C have similar performance as a catalyst for a hydrogen evolution reaction (HER) unlike the MOF structure of the comparative example. However, it can be seen that Ru—$ZrO_2$/C shows catalytic properties per mass that is at least 4 times higher than the amount of catalyst used unlike commercial catalysts such as E-tek Pt/C and E-tek Ru/C, and, thus, the catalyst according to Example 2 has a high efficiency per mass.

Referring to FIG. 11, E-tek Pt/C and E-tek Ru/C show an increase in energy overvoltage (η10) by from about 200% to about 250%, but the Ru—ZrO$_2$/C catalyst shows an increase by about 60% after 30,000 times of CV test. That is, the Ru—ZrO$_2$/C catalyst, according to the present disclosure, can be used for a longer time than the commercial E-tek Pt/C catalyst or E-tek Ru/C catalyst.

The above-described aspects are provided by way of illustration only and should not be construed as liming the present disclosure. Besides the above-described embodiments, there may be additional embodiments described in the accompanying drawings and the detailed description.

According to the above-described embodiments of the present disclosure, an electrocatalyst according to the present disclosure contains metal oxide nanoparticles dispersed on a porous carbon substrate and thus can have a high specific surface area and a high electric conductivity.

Also, metal of the metal oxide nanoparticles on the electrocatalyst, according to the present disclosure, may be present by substitution for a transition metal catalyst or adsorption of a precious metal catalyst on the metal oxide nanoparticles. Due to the transition metal catalyst or the precious metal catalyst, the electrocatalyst can be used in a hydrogen and oxygen evolution reaction of water splitting or an oxygen reduction reaction in a fuel cell and thus can substitute for the existing platinum catalyst used in a fuel cell.

For example, if the transition metal catalyst is used alone as a substitute for the platinum catalyst, an oxide of the transition metal catalyst may be easily dissolved in a strong acid through an electrochemical reaction and thus may be structurally unstable. Also, if a carbon support containing the precious metal catalyst is used as a substitute for the platinum catalyst, it is difficult for the precious metal catalyst to have single atomic scale and to be present as single atoms on the carbon support, and, thus, atoms of the precious metal catalyst may be aggregated. Meanwhile, if an oxide support is used as a supporting substrate for making the platinum single atom catalyst, it is possible to suppress the aggregation of atoms of the precious metal catalyst, but it is difficult to make desirable size and shape of the metal oxide support by general chemical synthesis strategy.

The electrocatalyst according to the present disclosure contains the metal oxide particles dispersed on the carbon substrate, and metal of the metal oxide particles is substituted for the transition metal catalyst or the transition metal catalyst bonded is adsorbed on the metal oxide particles by strong metal support interaction (SMSI) effect. Thus, the efficiency of the metal catalyst can be improved Also, a conventional non-platinum electrocatalyst having a nitrogen-doped carbon structure has been easily oxidized in an acidic atmosphere. However, the electrocatalyst according to the present disclosure is not easily oxidized in an acidic atmosphere and thus is excellent in terms of long-term stability compared to the conventional non-platinum electrocatalyst having a nitrogen-doped carbon structure.

That is, the electrocatalyst according to the present disclosure uses an oxide structure and thus has a very stable structure compared to a conventional non-platinum catalyst. By doping Fe metal with transition metal oxide or allowing an Ru single atom to be adsorbed on the metal oxide support, the electrocatalyst can improve the activity and stability of catalyst.

Also, a method of preparing an electrocatalyst according to the present disclosure includes pyrolysis an MOF structure containing metal oxide clusters and organic ligands and a metal catalyst to prepare metal oxide nanoparticles. According to the conventional technologies, it has been known that general metal oxides have high brittleness, solidity, chemical resistance and wear resistance, and, thus, it is difficult to micro-process them into nanoparticles or the like. However, in the method of preparing an electrocatalyst according to the present disclosure, metal oxide nanoparticles can be prepared through a simple process.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of preparing an electrocatalyst, the method comprising:
    performing a pyrolysis of a metal-organic framework (MOF) precursor, containing metal oxide clusters and organic materials, and a metal catalyst,
    wherein, based on the pyrolysis of the MOF structure due to thermal treatment, the organic materials form a carbon substrate, the metal oxide clusters form metal oxide particles dispersed on the carbon substrate, and metal of the metal oxide particles is substituted with the metal catalyst or the metal catalyst is adsorbed on the metal oxide particles.

2. The method of preparing an electrocatalyst of claim 1, wherein a specific surface area of the MOF precursor is in a range of 1800 m$^2$/g to 2200 m$^2$/g.

3. The method of preparing an electrocatalyst of claim 1, wherein after the pyrolysis of the MOF structure, the carbon substrate has a specific surface area of from 300 m$^2$/g to 800 m$^2$/g.

4. The method of preparing an electrocatalyst of claim 1, wherein the pyrolysis of the MOF precursor and the metal catalyst includes soaking the MOF precursor in a solution containing a salt of the metal catalyst, or metalation of the MOF precursor using a salt of the metal catalyst.

5. The method of preparing an electrocatalyst of claim 1, wherein the MOF precursor has a linear structure including any one or any two combination or more of a nanowire, a nanorod, a nanotube, a nanocable, a nanobelt, or a whisker.

6. The method of preparing an electrocatalyst of claim 1, wherein the metal oxide clusters include a member selected from the group consisting of $ZrO_x$, $CeO_x$, $HfO_x$, and combinations thereof.

7. The method of preparing an electrocatalyst of claim 1, wherein the thermal treatment is performed at a range of 700° C. to 1200° C.

8. The method of preparing an electrocatalyst of claim 1, wherein the metal oxide particles include a member selected from the group consisting of $ZrO_2$, $CeO_2$, $HfO_2$, and combinations thereof.

9. The method of preparing an electrocatalyst of claim 1, wherein the metal catalyst particles are transition metals or precious metals.

10. The method of preparing an electrocatalyst of claim 9, wherein the transition metals include a member selected from the group consisting of Fe, Mn, Co, Ni, Cu, Cr, and combinations thereof.

11. The method of preparing an electrocatalyst of claim 9, wherein the precious metals include a member selected from the group consisting of Ir, Ru, Os, Rh, Pt, Pd, Au, Ag, and combinations thereof.

12. The method of preparing an electrocatalyst of claim 9, wherein metal components of the metal oxide particles are substituted with the transition metals, or the transition metals and the precious metals are adsorbed on the metal oxide particles.

13. The method of preparing an electrocatalyst of claim 1, wherein the carbon substrate includes a member selected from the group consisting of graphite, porous carbon sheet, carbon fiber, graphene, graphene oxide, reduced graphene oxide, and combinations thereof.

* * * * *